United States Patent
Ryu et al.

(10) Patent No.: US 8,249,008 B2
(45) Date of Patent: Aug. 21, 2012

(54) METHOD AND APPARATUS FOR HANDLING ABNORMAL SITUATION IN EGPRS SYSTEM

(75) Inventors: Jin Sook Ryu, Anyang-si (KR); Ji Woong Lee, Anyang-si (KR); Yung Mi Kim, Anyang-si (KR); Chul Hoi Koo, Anyang-si (KR); Hyounhee Koo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 322 days.

(21) Appl. No.: 12/585,696

(22) Filed: Sep. 22, 2009

(65) Prior Publication Data

US 2010/0074104 A1    Mar. 25, 2010

Related U.S. Application Data

(60) Provisional application No. 61/099,543, filed on Sep. 23, 2008, provisional application No. 61/104,249, filed on Oct. 9, 2008.

(30) Foreign Application Priority Data

Sep. 25, 2008   (KR) .................. 10-2008-0094335

(51) Int. Cl.
*H04W 4/00* (2009.01)
*H04L 12/66* (2006.01)

(52) U.S. Cl. .................. 370/329; 370/463; 455/450

(58) Field of Classification Search .................. 370/310, 370/328, 329, 341, 431, 463; 455/450
See application file for complete search history.

(56) References Cited

U.S. PATENT DOCUMENTS

| | | | |
|---|---|---|---|
| 2008/0307284 A1* | 12/2008 | Aghili et al. .................. | 714/748 |
| 2009/0052378 A1* | 2/2009 | Aghili et al. .................. | 370/328 |
| 2009/0086685 A1* | 4/2009 | Aghili et al. .................. | 370/336 |
| 2011/0116368 A1* | 5/2011 | Bergstrom et al. .......... | 370/230 |

FOREIGN PATENT DOCUMENTS

EP    1 858 190    11/2007

OTHER PUBLICATIONS

Nokia et al., "Introduction of fast Ack/Nack Reporting", 3GPP TSG-GERAN Meeting WG #33bis, G2-070087, Mar. 2007.
Nokia et al., "Introduction of fast Ack/Nack Reporting", 3GPP TSG-GERAN Meeting WG #33bis, G2-070080, Mar. 2007.

* cited by examiner

*Primary Examiner* — Kerri Rose
(74) *Attorney, Agent, or Firm* — McKenna Long & Aldridge LLP (57) ABSTRACT

A method and apparatus for an enhanced general packet radio service (EGPRS) system is provided. A plurality of temporary block flows (TBFs) are established or reconfigured. If fast ACK/NACK reporting (FANR) activation for one TBF is inconsistent with FANR activation for another TBF, the allocated TBFs are aborted.

10 Claims, 8 Drawing Sheets

| RLC/MAC block | | | | | |
|---|---|---|---|---|---|
| RLC/MAC header | RLC data block 1 | RLC data block 2 (conditional) | RLC data block 3 (conditional) | RLC data block 4 (conditional) | ACK/NACK info. |

FIG. 7

| Bit | | | | | | | | Octet |
|---|---|---|---|---|---|---|---|---|
| 8 | 7 | 6 | 5 | 4 | 3 | 2 | 1 | |
| TFI | PANI | CES/P | | | USF | | | 1 |
| BSN1 | | PR | | TFI | | | | 2 |
| BSN1 | | | | | | | | 3 |
| BSN2 | | | | | | | BSN1 | 4 |
| CPS | | | | | BSN2 | | | 5 |

FIG. 8

METHOD AND APPARATUS FOR HANDLING ABNORMAL SITUATION IN EGPRS SYSTEM

CROSS-REFERENCE TO RELATED APPLICATIONS

This application claims the benefit of priority of U.S. Provisional application No. 61/099,543 filed on Sep. 23, 2008, U.S. Provisional application No. 61/104,249 filed on Oct. 9, 2008, and Korean Patent Application No. 10-2008-0094335 filed on Sep. 25, 2008, all of which are incorporated by reference in their entirety herein.

BACKGROUND OF THE INVENTION

1. Field of the Invention

The present invention relates to wireless communications, and more particularly, to a method and apparatus for handling an abnormal situation in a wireless communication system.

2. Related Art

Global system for mobile communication (GSM) is a radio technology which has been developed as a standardized system for radio communication systems in Europe and which has widely been deployed all over the world. General packet radio service (GPRS) was introduced to provide packet switched data services in circuit switched data services provided by the GSM. The enhanced data rate for GSM evolution (EDGE) employs an 8-phase shift keying (PSK) in addition to the Gaussian minimum shift keying (GMSK) employed in the GSM. The enhanced general packet radio service (EGPRS) represents the GPRS using the EDGE.

A packet data channel (PDCH) denotes a physical channel used for GPRS/EGPRS traffic. Examples of logical channels mapped onto the PDCH include a packet common control channel (PCCCH) used for control signals required in packet transmission initialization, a packet data traffic channel (PDTCH) for user data, a packet associated control channel (PACCH) for dedicated signaling, and so on.

An enhanced general packet radio service phase 2 (EGPRS2) supporting further various modulation and coding schemes has recently being developed. While the EGPRS supports only two modulation schemes (i.e., GMSK and 8-PSK), the EGPRS2 supports five modulation schemes (i.e., GMSK, quadrature phase shift keying (QPSK), 8-PSK, 16-quadrature amplitude modulation (QAM), and 32-QAM). There are two levels of EGPRS2, that is, EGPRS2-A and EGPRS2-B. The EGPRS2-A supports the GMSK, 8-PSK, 16-QAM, and 32-QAM. The EGPRS2-B supports the GMSK, QPSK, 16-QAM, and 32-QAM. A downlink EGPRS2-A uses modulation schemes MCS-1 to MCS-4 (MCS stands for Modulation and Coding Scheme) and DAS-5 to DAS-12 (DAS stands for Downlink level A modulation and coding Scheme). An uplink EGPRS2-A uses modulation schemes MCS-1 to MCS-6 and UAS-7 to UAS-11 (UAS stands for Uplink level A modulation and coding Scheme). A downlink EGPRS2-B uses modulation schemes MCS-1 to MCS-4 and DBS-5 to DBS-12 (DBS stands for Downlink level B modulation and coding Scheme). An uplink EGPRS2-B uses modulation schemes MCS-1 to MCS-4 and UBS-5 to UBS-12 (UBS stands for Uplink level B modulation and coding Scheme). A modulation and coding scheme for each level in the EGPRS2 may be found in clause 6.5.5.1.3 of 3GPP TS 43.064 V7.6.0 (2007-08) "Technical Specification; GSM/EDGE Radio. Access Network; General Packet Radio Service (GPRS); Overall description of the GPRS radio interface; Stage 2 (Release 7)".

Hereinafter, an EGPRS system is a system to support EGPRS or both EGPRS and EGPRS2.

An EGPRS system provides a multi-data rate by using various modulation and coding schemes. For example, data is transmitted with various data rates through the PDTCH. The data rate is adjusted on the basis of the link quality in a link adaptation process. If the link quality is good, data is transmitted with a high data rate. On the contrary, if the link quality is poor, data is transmitted with a low data rate. Data may be lost when transmitted according to a modulation and coding scheme that requires a data rate higher than achievable with the link quality. In link adaptation, a data throughput is increased using the highest possible data rate by using a specific modulation and coding scheme with a predetermined link quality.

In the EGPRS system, link adaptation is performed by a radio link control (RLC)/medium access control (MAC) layer. The RLC layer and the MAC layer are respectively located in a mobile station (MS) and a base station (BS). Protocol data units (PDUs) of the RLC layer are delivered to an RLC entity, and are split in an RLC/MAC block unit by the RLC entity. Thereafter, communication is achieved in an RLC/MAC block unit. Each RLC/MAC block is numbered by a block sequence number (BSN). The BSN is used to modify an erroneous block by tracking an RLC/MAC block between a receiving RLC/MAC entity and a transmitting RLC/MAC entity. In downlink transmission, the BS requests the MS to send a status of a received block, and the MS transmits a packet downlink acknowledgment/negative-acknowledgment (ACK/NACK) message in response thereto. In uplink transmission, the MS requests the BS to send a status of a receive block, and the BS transmits a status report message (e.g., a packet uplink ACK/NACK message) in response thereto.

Processes used in the MAC/RLC layer are disclosed in 3rd Generation Partnership. Project (3GPP); Technical Specification Group. GSM/EDGE Radio Access Network; General Packet Radio Service (GPRS); Mobile. Station (MS)-Base Station System (BSS) interface; Radio Link Control/Medium Access Control (RLC/MAC) protocol (Release 7), 3GPP TS 44.060 V8.1.0 (2008-05). Clauses 10.3a.3 and 10.3a.4 of the 3GPP TS 44.060 disclose an uplink RLC/MAC header and a downlink RLC/MAC header for various MCSs. Among fields included in the header, an uplink state flag (USF) indicates an owner or usage of a next uplink radio block in the same timeslot. A relative reserved block period (RRBP) field specifies a single uplink block in which the MS transmits a packet control acknowledgment message of a packet associated control channel (PACCH) block through a network. An EGPRS supplementary/polling (ES/P) field indicates an effectiveness or non-effectiveness of the RRBP field.

As a part of EGPRS evolution, latency reduction is proposed. The latency reduction includes two methods, i.e., reduced transmission time interval (RTTI) configuration and fast ACK/NACK reporting (FANR). According to the RTTI configuration, a radio block is transmitted through a PDCH-pair to reduce a period for transmitting one radio block to 10 ms from 20 ms which is required in the conventional basic transmission time interval (BTTI) configuration. According to the FANR, ACK/NACK information is piggy-backed on a radio block without having to transmitting ACK/NACK by using an additional message. Thus, the ACK/NACK can be transmitted and received without additional message assignment.

FANR activation is included in transmission when a downlink assignment message or an uplink assignment message is assigned to the MS by the network. When the FANR activation is instructed, the MS performs uplink transmission or downlink transmission by using the FANR.

According to clause 5.2 of the 3GPP TS 44.060, an MS supporting the latency reduction can be assigned with a temporary block flow (TBF) for which FANR is activated in the RTTI configuration or the BTTI configuration. If the MS is assigned with the TBF for which FANR is activated, the network activates FANR for all concurrent TBFs assigned to the MS. This implies that the FANR is activated or inactivated for the all concurrent TBFs. Further, the network individually instructs activation/inactivation of the FANR when the uplink TBF and the downlink TBF are concurrently allocated or reallocated.

At present, the MS applies the same FANR activation/inactivation to all concurrent TBFs. However, a method in which the MS handles an abnormal situation is not provided yet. Herein, the abnormal situation is that the network instructs inconsistent FANR activation/inactivation for the uplink TBF and the downlink TBF to the MS. That is, this is a case where the network instructs FANR activation to the MS as to the uplink TBF, and instructs FANR inactivation to the MS as to the downlink TBF. If the MS arbitrarily activates or inactivates the FANR for all concurrent TBFs, the network does not know how the FANR is operated by the MS, which may result in data loss in downlink transmission and/or uplink transmission.

SUMMARY OF THE INVENTION

The present invention provides a method and apparatus for handling an abnormal situation in an enhanced general packet radio service (EGPRS) system.

In an aspect, a mobile station for handling abnormal situation in an enhanced general packet radio service (EGPRS) system is provided. The mobile station includes a radio frequency (RF) unit for transmitting and receiving a radio signal, and a processor operatively coupled with the RF unit. The processor is configured to receive at least one message for configuring a first temporary block flow (TBF) and a second TBF from a network, determine whether fast ACK/NACK reporting (FANR) activation for the first TBF is inconsistent with FANR activation for the second TBF, and abort the allocated first and second TBFs if FANR activation for the first TBF is inconsistent with FANR activation for the second TBF.

If the FANR is activated, a radio link control (RLC)/medium access control (MAC) block may comprise an RLC/MAC header, at least one RLC data block and ACK/NACK information, and the RLC/MAC header may comprise a field indicating whether. ACK/NACK information is included.

The at least one message may be any one of a packet downlink assignment message, a packet uplink assignment message, a packet timeslot reconfigure message, a multiple TBF downlink assignment message, a multiple TBF uplink assignment message, a multiple TBF timeslot reconfigure message, a packet CS release indication message, a PS handover command message, and a DTM handover command message.

The processor may be configured to determine that FANR activation for the first TBF is inconsistent with FANR activation for the second TBF if FANR for the first TBF is activated and FANR for the second TBF is not activated.

The processor may be configured to abort all allocated TBFs if FANR activation for the first TBF is inconsistent with FANR activation for the second TBF.

The first TBF and the second TBF may be configured with different messages.

In another aspect, a method of handling abnormal situation in an EGPRS system, performed by a mobile station is provided. The method includes receiving at least one message for establishing or reconfiguring a plurality of temporary block flows (TBFs) from a network, determining whether fast ACK/NACK reporting (FANR) activations are inconsistent for the plurality of TBFs, and aborting the allocated plurality of TBFs if FANR activations are inconsistent.

An operation of a mobile station is specified even if a network instructs inconsistent fast ACK/NACK reporting (FANR) activate/inactivation for downlink transmission and uplink transmission. Therefore, data loss can be prevented, and waste of resources can be reduced.

DESCRIPTION OF EXEMPLARY EMBODIMENTS

Figure 1:
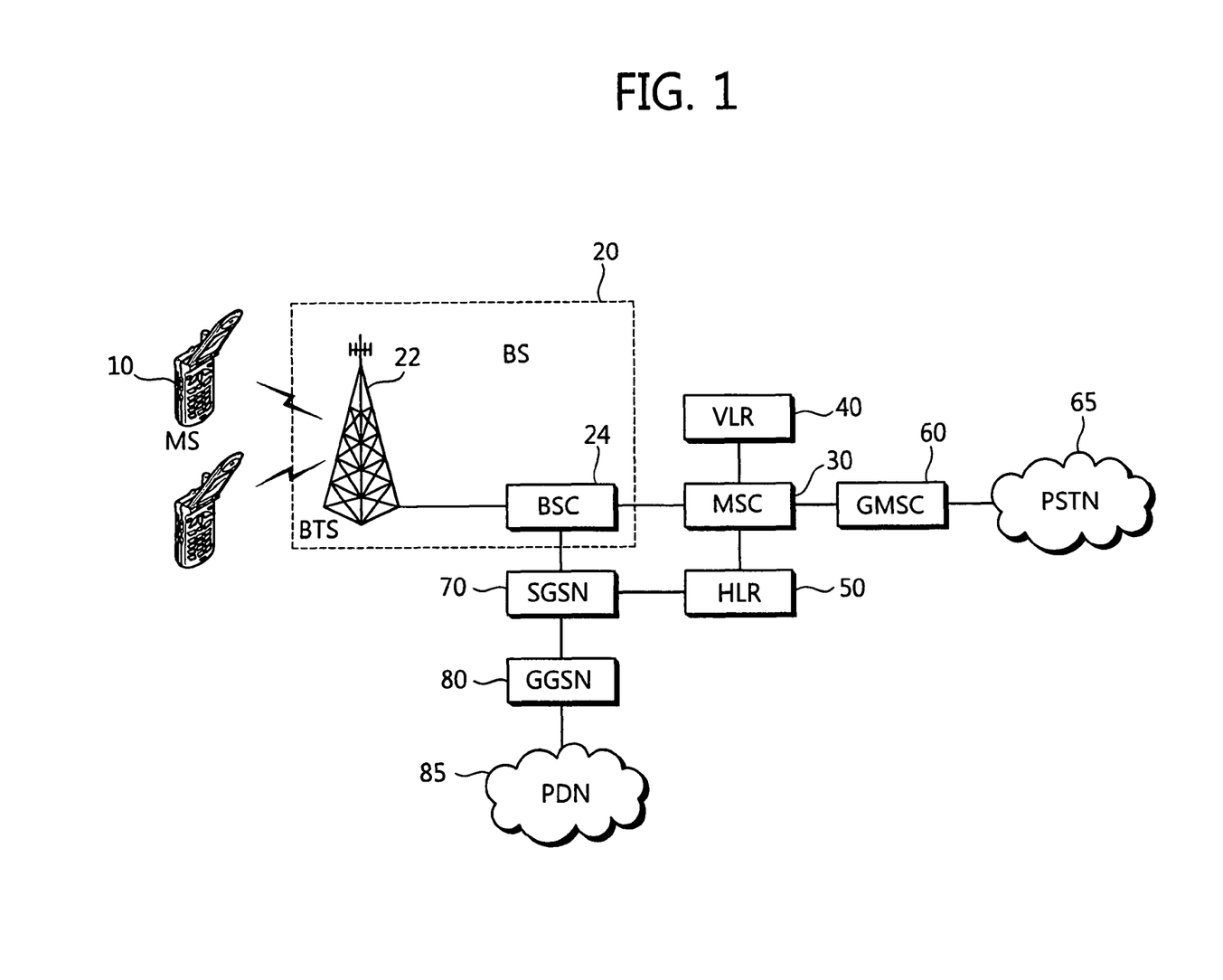
FIG. 1 is a block diagram illustrating a wireless communication system.

FIG. 1 is a block diagram illustrating a wireless communication system. Wireless communication systems are widely used to provide a variety of communication services of voice, packet data, and so on. This system is based on an enhanced general packet radio service (EGPRS). The EGPRS system is a system to support EGPRS or both EGPRS and EGPRS2.

Referring to FIG. 1, a mobile station (MS) 10 is a communication instrument carried by a user and may be called using other terms such as user equipment (UE), a user terminal (UT), and a subscriber station (SS), a wireless device, etc.

The communication system also comprises a base station (BS) 20 which includes a base transceiver station (BTS) 22 and a base station controller (BSC) 24. The BTS 22 communicates with the MS 10 in a cellular area through a radio interface and performs a synchronization function with the MS 10. The BSC 24 interfaces at least one BTS 22 with a mobile switching center (MSC) 30. The BS 20 may be called a base station subsystem, a Node-B, or an access point.

The MSC 30 connects the BS 20 to a different kind of network such as a public switching telephone network (PSTN) 65 or a public land mobile network (PLMN) through a gateway MSC (GMSC) 60. A visitor location register (VLR) 40 stores temporary user data, which includes information on the roaming of all the MSs 10 in the service area of the MSC 30. A home location register (HLR) 50 includes information on all the subscribers in the home network. A serving GPRS support node (SGSN) 70 takes in charge the management of the mobility of the subscribers. A gateway GPRS data network (GGSN) 80 routes a packet at the current position of the MS 10 to interface the MS with an external packet data network such as a public data network (PDN) 85.

Hereinafter, a radio resource (RR) mode shows an RR status in which the MS resides in a higher layer to indicate circuit switching, packet switching, or switching supporting both the circuit switching and the packet switching. An idle mode implies that there is no RR connection. A dedicated mode implies that an RR connection is established. The RR connection implies a physical connection used for two peer entities for supporting exchange of information flow in a higher layer. A packet idle mode implies that a temporary block flow (TBF) is not provided. A packet transfer mode implies that at least one TBF is provided by allocating a radio resource to the MS. The TBF is a logical connection offered by two medium access control (MAC) entities so as to support the unidirectional transfer of a radio link control (RLC) protocol data unit (PDU) on basic physical subchannels. At least one TBF is provided in a packet transfer mode. In the packet transfer mode, radio resources on one or more packet data physical channels for the transfer of packet data are assigned to the MS. MAC-idle state means a MAC-control-entity state where there is no assigned basic physical subchannel. A temporary flow identity (TFI) is assigned to each TBF by the network. The MS assumes that the TFI value is unique among concurrent TBFs in the same direction (uplink or downlink) on all packet data channels (PDCHs) used for the TBFs. The same TFI value may be used concurrently for TBFs on other PDCHs in the same direction and for TBFs in the opposite direction.

Figure 2:
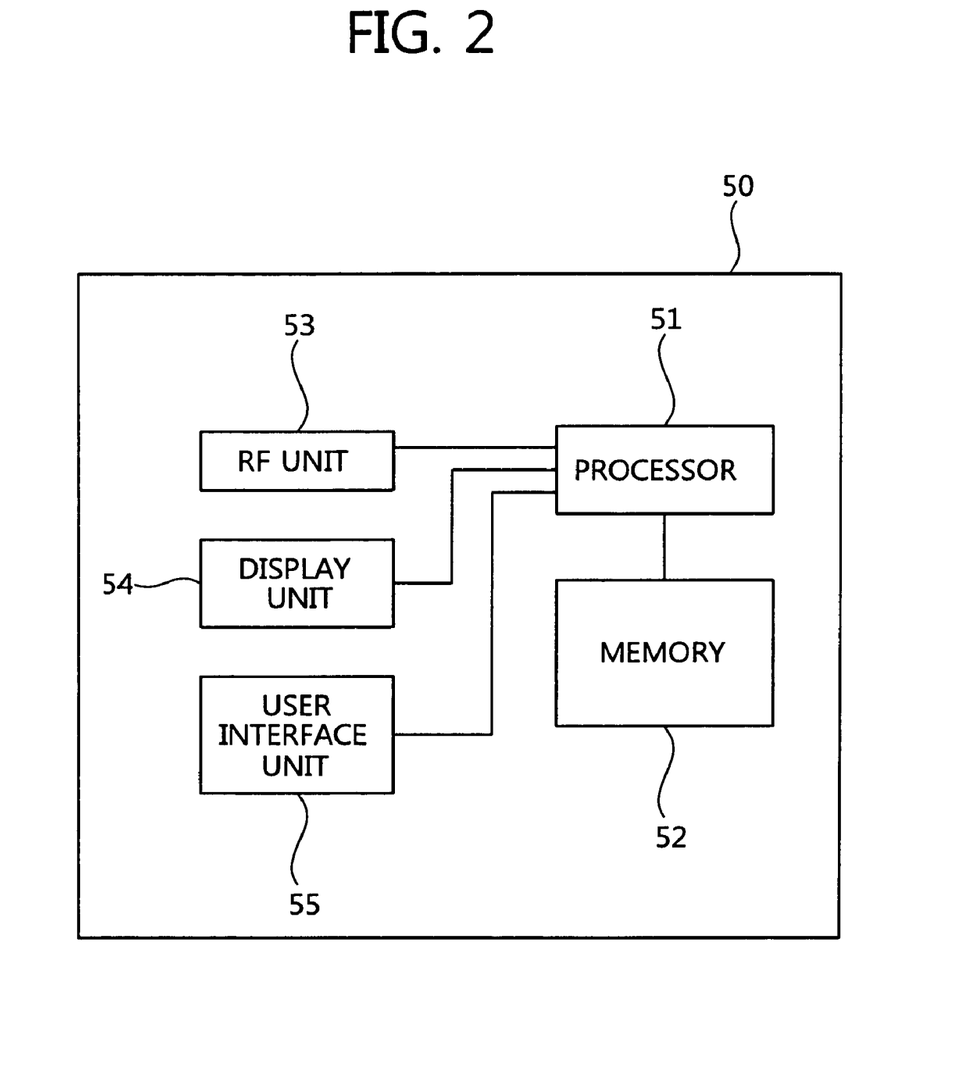
FIG. 2 is a block diagram showing constitutional elements of a mobile station.

FIG. 2 is a block diagram showing constitutional elements of an MS. An MS 50 includes a processor 51, a memory 52, a radio frequency (RF) unit 53, a display unit 54, and a user interface unit 55. The memory 52 is operatively coupled to the processor 51 and stores an operating system of the MS, applications, and general files. The display unit 54 displays a variety of information of the MS and may use a well-known element such as a liquid crystal display (LCD), an organic light emitting diode (OLED), etc. The user interface unit 55 can be configured with a combination of well-known user interfaces such as a keypad, a touch screen, etc. The RF unit 53 is coupled to the processor 51 and transmits and/or receives radio signals.

Functions of a radio link control (RLC) layer and a medium access control (MAC) layer are implemented in the processor 51. The processor generates a data block (e.g., an RLC/MAC block) transmitted on a radio block. The data block includes at least one. RLC data block and ACK/NACK information. The processor 51 establishes or reconfigures a TBF.

The processor 51 may include application-specific integrated circuit (ASIC), other chipset, logic circuit and/or data processing device. The memory 52 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in memory 52 and executed by processor 51. The memory 52 can be implemented within the processor 51 or external to the processor 51 in which case those can be communicatively coupled to the processor 51 via various means as is known in the art.

Figure 3:
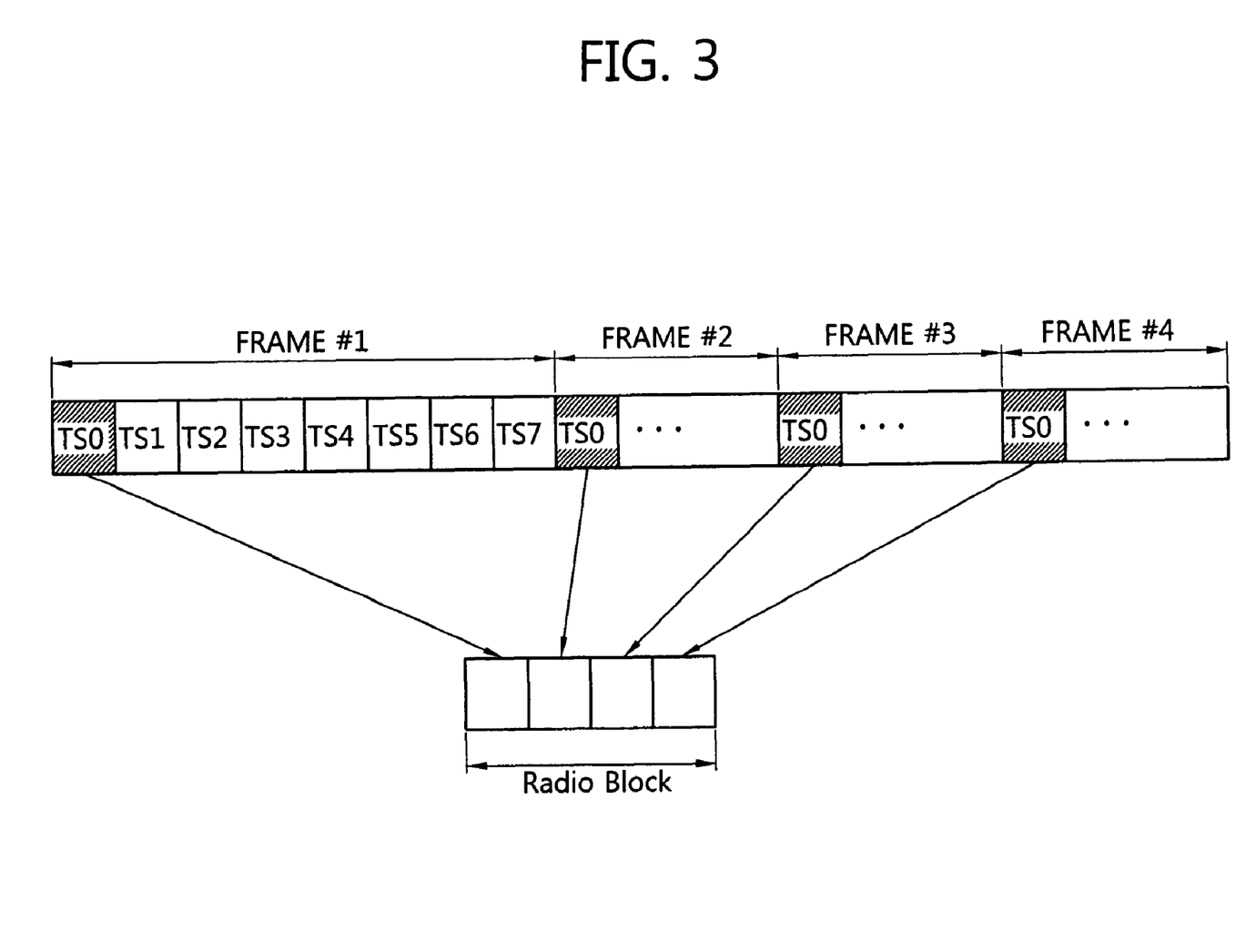
FIG. 3 is a diagram showing the concept of a radio block.

FIG. 3 is a diagram showing the concept of a radio block. The radio block is a basic unit used for transfer of one data block. The radio block is transmitted through a packet data channel (PDCH).

Referring to FIG. 3, one frame consists of 8 timeslots TS0, TS1, . . . , and TS7 in an EGPRS system. The radio block consists of 4 consecutive timeslots belonging to different frames. For example, the radio block can be configured by taking first timeslots TS0 one by one from the 4 consecutive frames. Although the first timeslot TS0 is taken herein, it is also possible to take another timeslot.

According to the structure of FIG. 3, one radio block is transmitted during 4 transmission time intervals (TTIs). 1 TTI is a time for transmitting one frame.

The radio block can be transmitted through two PDCHs, and the two PDCHs are referred to as one PDCH-pair. This is referred to as a reduced transmission time interval (RTTI) configuration, whereas the structure of FIG. 3 is referred to as a basis transmission time interval (BTTI) configuration. In the RTTI configuration, the radio block is transmitted through two consecutive 2 PDCHs in one frame. Therefore, one radio block is transmitted for 2 TTIs.

A channel, i.e. a timeslot sequence, uses the same timeslot number in every TDMA frame and is defined by a timeslot number and a TDMA frame number sequence. A timeslot sequence is regarded as a timeslot unless there is any explicit different explanation in this description.

Figure 4:
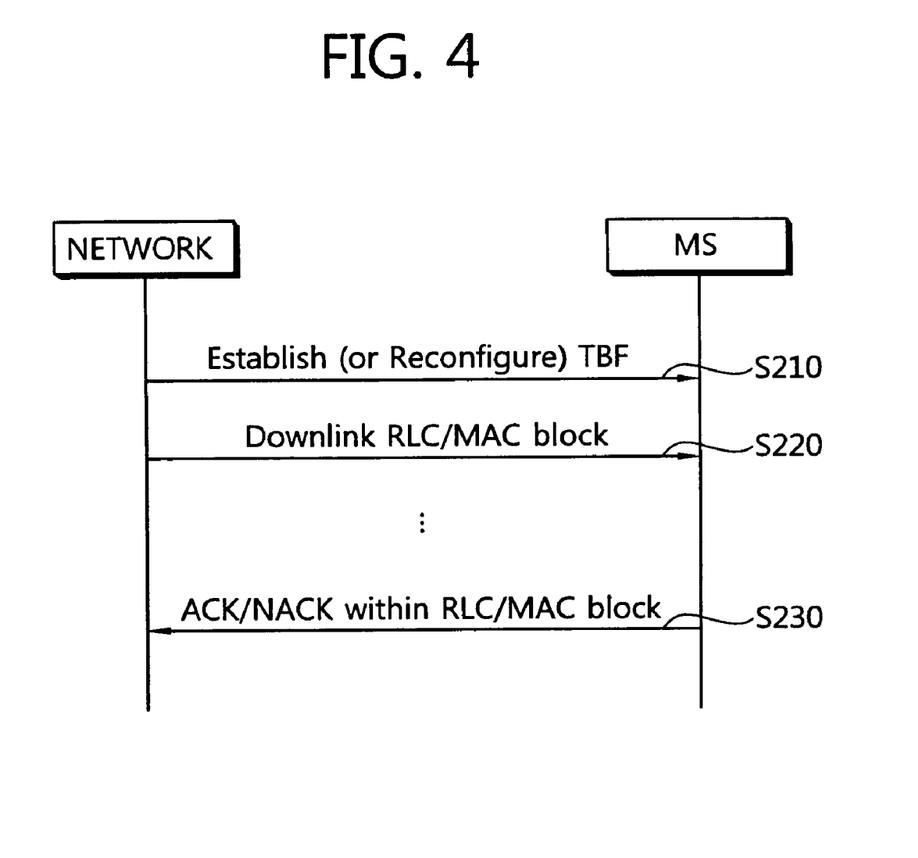
FIG. 4 is a flow diagram showing a method of transmitting acknowledgement (ACK)/negative-acknowledgment (NACK) information in downlink transmission.

FIG. 4 is a flow diagram showing a method of transmitting ACK/NACK information in downlink transmission.

Referring to FIG. 4, in step. S210, a TBF is established or reconfigured between a network and an MS. Establishment of the TBF implies that a new. TBF is configured. Reconfiguration of the TBF implies that previous TBF configuration is modified. Examples of a message used for establishing or reconfiguring the TBF include a packet downlink assignment message, a packet uplink assignment message, a packet timeslot reconfigure message, a multiple TBF downlink assignment message, a multiple TBF uplink assignment message, a multiple. TBF timeslot reconfiguration message, a packet CS release indication message and so on.

In the process of establishing or reconfiguring the TBF, the network reports whether fast ACK/NACK reporting (FANR) is used for a given TBF. For example, as shown in Table 1, activation/inactivation of FANR is indicated as a part of an information element (IE) included in the packet downlink assignment message.

TABLE 1

< Packet Downlink Assignment message content > ::=
. . .
{ 0 | 1 -- '1' indicates Fast Ack/Nack Reporting is activated
<EVENT_BASED_FANR: bit (1) > }
. . .

An 'EVENT_BASED_FANR' field indicates whether event-based FANR is used. The network appends an FANR activation field to a message transmitted to the MS in the process of establishing or reconfiguring the TBF. The FANR activation field indicates whether to append ACK/NACK information to a data block. The data block denotes a block transmitted using a radio block. In the following description, the data block is assumed to be an RLC/MAC block exchanged between RLC/MAC entities.

In step S220, the network transmits a downlink RLC/MAC block.

In step S230, when FANR is activated for an allocated TBF, the MS reports a reception status of a downlink data block (i.e., RLC/MAC block) to a BS by using ACK/NACK information included in an uplink data block.

The ACK/NACK information indicates the reception status of the downlink RLC/MAC block. The ACK/NACK information may include a success or failure of decoding of at least one RLC data block included in the downlink RLC/MAC block or a success or failure of decoding of an RLC/MAC header. The ACK/NACK information may consist of 1 bit or 2 bits or more bits, and the number of bits is not limited thereto.

When FANR is activated, a reception status of a data block for a TBF allocated in one direction is transmitted by being included in a data block transmitted in another direction. In the BTTI configuration, 4 TTIs are required to transmit one radio block, and more TTIs may be required to transmit the reception status by using an additional message. When the reception status of the downlink data block is evaluated using the ACK/NACK information included in the uplink data block, a message for transmitting additional ACK/NACK information is not required. In addition, whether the ACK/NACK information is included in the data block is indicated in a process of configuring a TBF, and thus signaling is not required to indicate transmitting and/or receiving of additional ACK/NACK information for the TBF.

Figure 5:
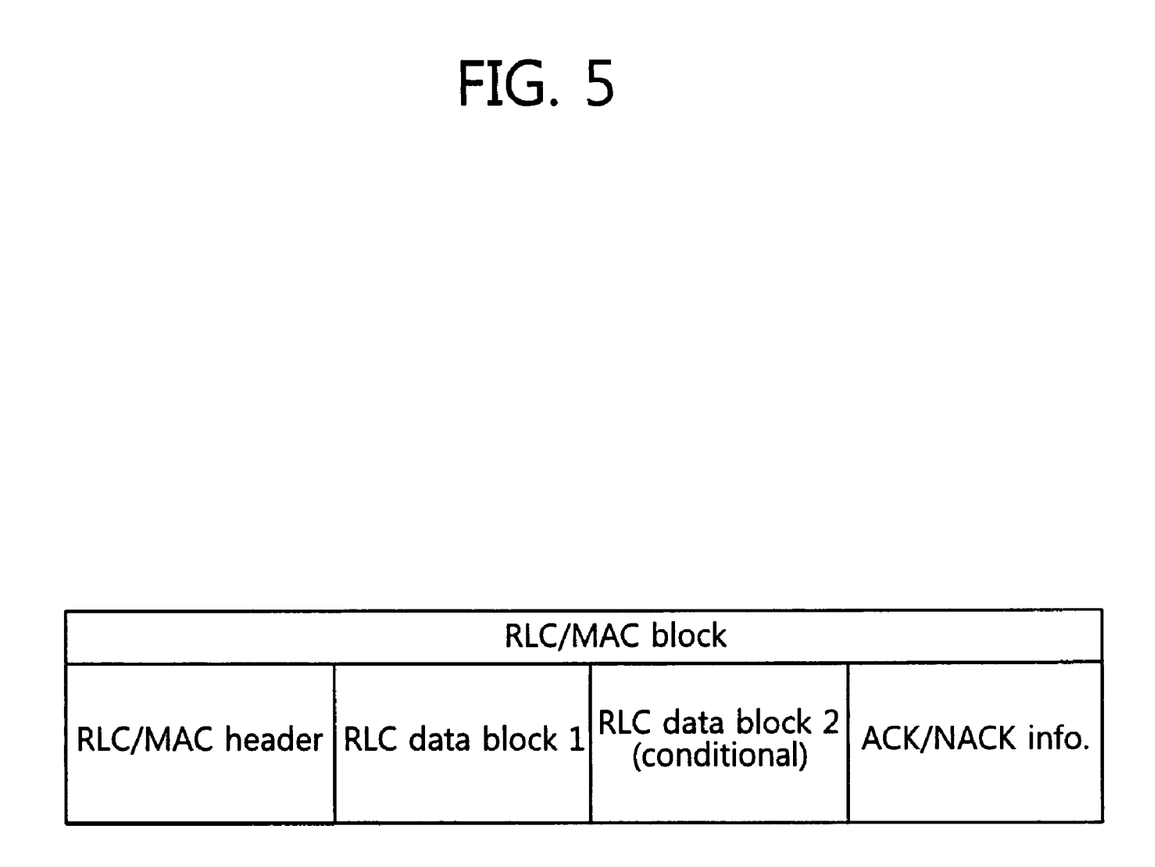
FIG. 5 shows an example of a data block.

FIG. 5 shows an example of a data block. An RLC/MAC block includes an RLC/MAC header, at least one RLC data block, and ACK/NACK information. The RLC data block includes at least one higher-layer PDU. The RLC/MAC header indicates whether information on the RLC data block or the ACK/NACK information is included.

Figure 6:
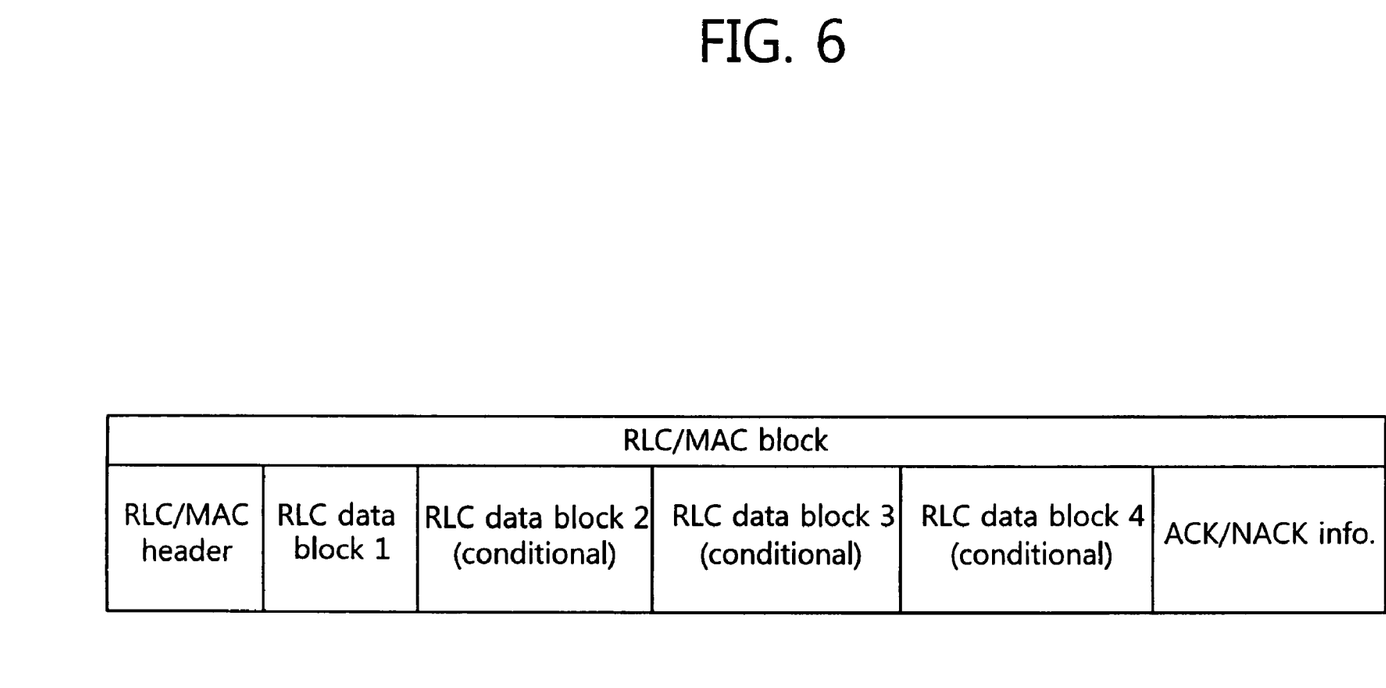
FIG. 6 shows another example of a data block.

FIG. 6 shows another example of a data block. An RLC/MAC block of FIG. 6 includes up to 4 RLC data blocks and also includes ACK/NACK information.

Figure 7:
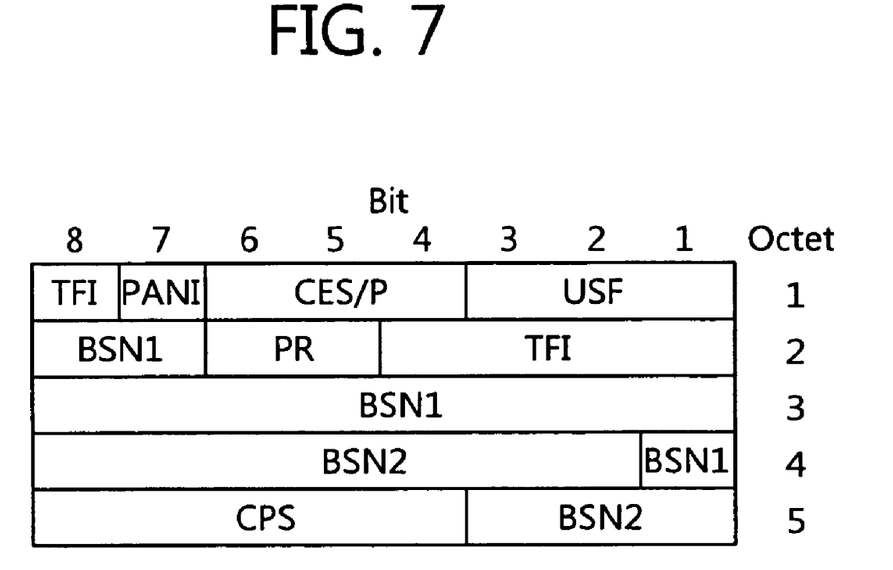
FIG. 7 shows an example of a radio link control (RLC)/medium access control (MAC) header for the support of fast ACK/NACK reporting (FANR).

FIG. 7 shows an example of an RLC/MAC header for the support of FANR.

Referring to FIG. 7, the RLC/MAC header includes a TFI field, a PAM field, an uplink state flag (USF) field, and so on. The TFI field identifies a TBF to which an RLC data block belongs. The USF indicates an owner or usage of a next uplink radio block in the same timeslot. A power reduction (PR) field indicates power level reduction of a current RLC/MAC block. For a block sequence number (BSN) field of the present embodiment, 2 RLC data blocks, i.e., BSN1 and BSN2, exist in the RLC/MAC block. The BSN2 is a relative value with respect to the BSN1. A combined EGPRS supplementary/polling (CES/P) field indicates which field is included in a next uplink radio block reserved by the CES/P field. A coding and puncturing scheme indicator (CPS) field indicates a type of puncturing and channel coding used in data blocks.

The PANI field indicates whether piggy-backed ACK/NACK information exists in a received downlink RLC/MAC data block. That is, the network first searches for the PANT field from an RLC/MAC header of a received uplink RLC/MAC block. If the PAM field indicates that the piggy-backed ACK/NACK (PAN) information exists in the RLC/MAC data block, the network recognizes that the PAN information exists in the received RLC/MAC data block, and then performs channel decoding in a format in which a PAN field is inserted.

Figure 8:
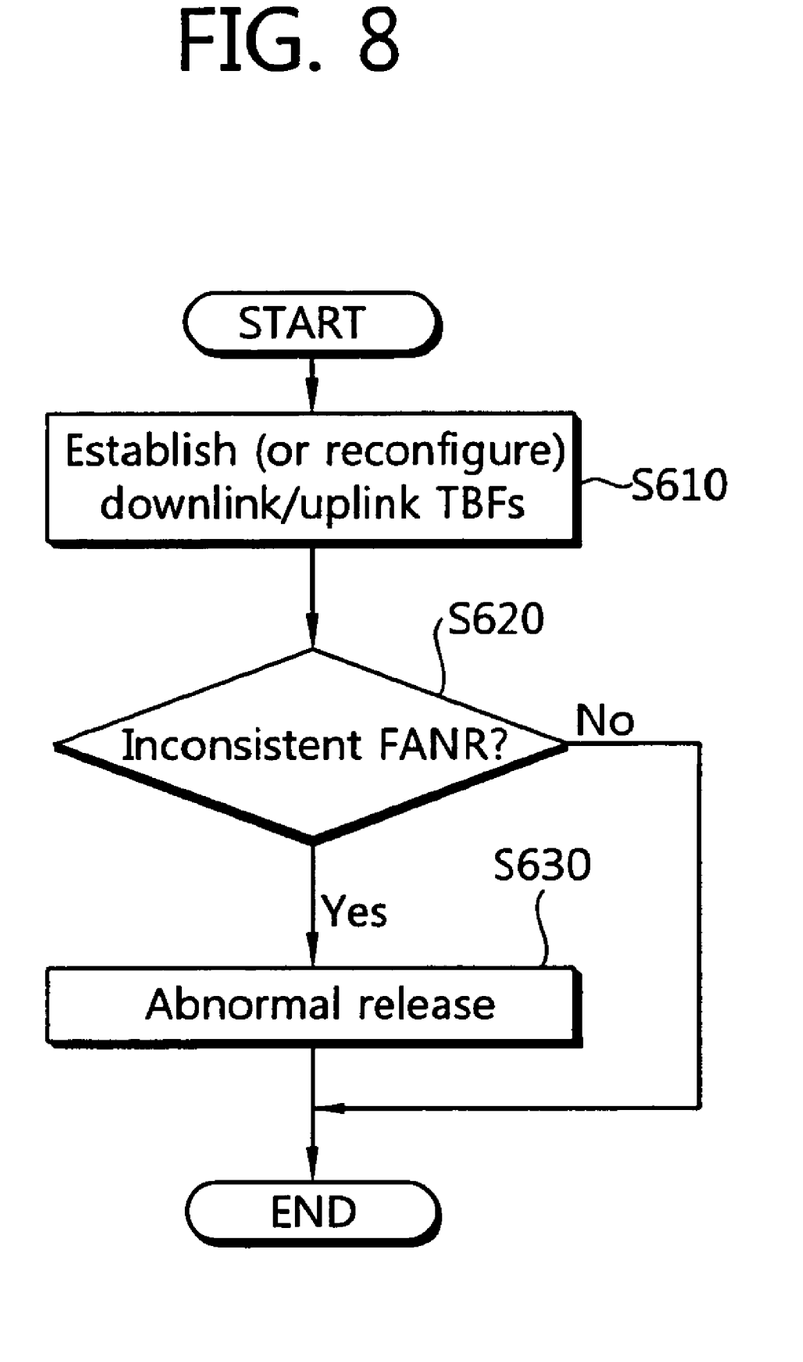
FIG. 8 is a flowchart showing a method of handling an abnormal situation according to an embodiment of the present invention.

FIG. 8 is a flowchart showing a method of handling an abnormal situation according to an embodiment of the present invention. The method may be performed by an MS, or may be performed by a processor which is one of constitutional elements of the MS.

Referring to FIG. 8, in step S610, a plurality of TBFs are established (or reconfigured). The downlink/uplink TBFs can be concurrently established, or the downlink TBF and the uplink TBF may be separately established. A message for allocating the uplink TBF and/or the downlink TBF to one MS may be a packet downlink assignment message, a packet uplink assignment message, a packet timeslot reconfigure message, a multiple TBF downlink assignment message, a multiple TBF uplink assignment message, a multiple TBF timeslot reconfigure message, a packet CS release indication message, a PS handover command (PS handover radio resources 2) message, a DTM handover command (DTM handover PS radio resources 2) message, and so on.

Activation/inactivation of FANR can be indicated for each of the downlink TBF and the uplink TBF while establishing (or reconfiguring) the downlink TBF and the uplink TBF. The following table shows activation/inactivation of FANR in an information element (IE) included in the packet timeslot reconfigure message.

TABLE 2

< Packet Timeslot Reconfigure message content > ::=
...
{ 0 -- Fast Ack/Nack Reporting is not activated for the downlink
TBF; this value shall be indicated if a downlink TBF is not addressed
| 1 -- Fast Ack/Nack Reporting is activated for the downlink TBF
< EVENT_BASED_FANR: bit (1) > }
{ 0 -- Fast Ack/Nack Reporting is not activated for the uplink TBF
| 1 -- Fast Ack/Nack Reporting is activated for the uplink TBF
...

In step S620, it is determined whether activation/inactivation of FANR is inconsistently achieved for the downlink TBF and the uplink TBF. If activation/inactivation of FANR is consistently achieved, for example, if FANR is activated (or inactivated) for both the downlink TBF and the uplink TBF, downlink transmission and/or uplink transmission are normally performed.

In step S630, if activation/inactivation is inconsistently achieved for the downlink TBF and the uplink TBF, an abnormal release process is performed. For example, the inconstant activation/inactivation is a case where FANR for the uplink TBF is activated and FANR for the downlink TBF is inactivated. The abnormal release process aborts all TBFs being performed by the MS. When operating in a packet transfer mode, the MS returns to a packet idle mode, and starts establishment of one or more new uplink TBFs. When operating in a dual transfer mode, the MS returns to a dedicated mode, and starts establishment of one or more new uplink TBFs. If the MS fails to establish the new uplink TBF, the MS reports an RLC/MAC failure to a higher layer.

If a mobile station receives at least one message that would result in one or more TBFs with FANR activated and one or more TBFs with FANR not activated when considering all concurrent TBFs assigned to that mobile station, the mobile station may perform an abnormal release with access retry if there is at least one ongoing uplink TBF, otherwise it may perform an abnormal release without retry.

In abnormal release without retry, the mobile station aborts all TBFs on PDCH(s) in progress and report an RLC/MAC failure to upper layers. The mobile station in packet transfer mode or MAC-Shared state returns to packet idle mode or MAC-Idle state; the mobile station in dual transfer mode or MAC-DTM state shall return to dedicated mode or MAC-Dedicated state.

In abnormal release with access retry, the mobile station shall abort all TBFs in progress. The mobile station in packet transfer mode returns to packet idle mode and initiate the establishment of one or more new uplink TBFs. The mobile station in dual transfer mode shall return to dedicated mode and initiate the establishment of one new uplink TBF (if exclusive allocation is used) or one or more new uplink TBFs (if exclusive allocation is not used) using the appropriate DTM procedure on the main DCCH. In case the mobile station fails to establish a new uplink TBF, the mobile station reports an RLC/MAC failure to upper layers for that TBF.

To successfully exchange an RLC/MAC block between the network and the MS, activation/inactivation of FANR has to be correctly achieved between the network and the MS. For example, since a structure of an RLC/MAC header for inactivated FANR is different from a structure of an RLC/MAC header for activated FANR, it is difficult to successfully decoding the RLC/MAC block when activation/inactivation of FANR is incorrectly reported. In addition, if it is determined that the MS is inactivated even if FANR is activated, not only a header structure but also a channel decoding structure of the RLC/MAC block is changed, which results in a phenomenon in which all received data is broken when decoded.

According to a currently available standard specification 3GPP TS 44.060 V8.1.0 (2008-05), activation/inactivation of FANR is separately indicated when downlink/uplink TBFs are concurrently allocated/reallocated. Further, the MS applies the same activation/inactivation of FANR to all concurrent TBFs. However, an operation of the MS is not introduced for a case where the network instructs inconsistent activation/inactivation of FANR for the downlink/uplink TBF. If the MS arbitrarily activates or inactivates FANR of all concurrent TBFs, activation/inactivation of FANR may be inconsistent between the MS and the network, and as a result, an RLC/MAC block may be lost. Therefore, if the network instructs inconsistent FANR activation/inactivation for the downlink TBF and the uplink TBF, the MS aborts TBF transmission by handling this situation as an abnormal situation. Accordingly, loss of the data block can be prevented, and waste of resources can be reduced.

A PS handover command message is sent on the PACCH by a network to a MS to command the MS to leave the current cell and change to a new cell. If the PS handover command message results in one or more TBFs with FANR activated and one or more TBFs with FANR not activated for that MS, the MS considers the PS handover to have failed. If the network instructs inconsistent FANR activation/inactivation for TBFs during handover, the MS considers the handover is failed as an abnormal situation.

An operation of a mobile station is specified even if a network instructs inconsistent fast ACK/NACK reporting (FANR) activate/inactivation for downlink transmission and uplink transmission. Therefore, data loss can be prevented, and waste of resources can be reduced.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A mobile station for handling abnormal situation in an enhanced general packet radio service (EGPRS) system, comprising:
    a radio frequency (RF) unit for transmitting and receiving a radio signal; and
    a processor operatively coupled with the RF unit and configured to:
    receive at least one message for configuring a first temporary block flow (TBF) and a second TBF from a network;
    determine whether fast ACK/NACK reporting (FANR) activation for the first TBF is inconsistent with FANR activation for the second TBF; and
    abort the allocated first and second TBFs if FANR activation for the first TBF is inconsistent with FANR activation for the second TBF,
    wherein the processor is configured to determine that FANR activation for the first TBF is inconsistent with FANR activation for the second TBF if FANR for the first TBF is activated and FANR for the second TBF is not activated.

2. The mobile station of claim 1, wherein, if the FANR is activated, a radio link control (RLC)/medium access control (MAC) block comprises an RLC/MAC header, at least one RLC data block and ACK/NACK information, and the RLC/MAC header comprises a field indicating whether ACK/NACK information is included.

3. The mobile station of claim 1, wherein the at least one message is any one of a packet downlink assignment message, a packet uplink assignment message, a packet timeslot reconfigure message, a multiple TBF downlink assignment message, a multiple TBF uplink assignment message, a multiple TBF timeslot reconfigure message, a packet CS release indication message, a PS handover command message, and a DTM handover command message.

4. The mobile station of claim 1, wherein the processor is configured to abort all allocated TBFs if FANR activation for the first TBF is inconsistent with FANR activation for the second TBF.

5. The mobile station of claim 1, wherein the first TBF and the second TBF are configured with different messages.

6. A method of handling abnormal situation in an EGPRS system, performed by a mobile station, the method comprising:
    receiving at least one message for establishing or reconfiguring a plurality of temporary block flows (TBFs) from a network;
    determining whether fast ACK/NACK reporting (FANR) activations are inconsistent for the plurality of TBFs; and
    aborting the allocated plurality of TBFs if FANR activations are inconsistent,
    wherein the FANR activations are determined to be inconsistent if FANR for one of the plurality of TBFs is activated and FANR for the other one of the plurality of TBFs is not activated.

7. The method of claim 6, wherein the at least one message is any one of a packet downlink assignment message, a packet uplink assignment message, a packet timeslot reconfigure message, a multiple TBF downlink assignment message, a multiple TBF uplink assignment message, a multiple TBF timeslot reconfigure message, a packet CS release indication message, a PS handover command message, and a DTM handover command message.

8. The method of claim 6, wherein, if the FANR is activated, a radio link control (RLC)/medium access control (MAC) block comprises an RLC/MAC header, at least one RLC data block and ACK/NACK information, and the RLC/MAC header comprises a field indicating whether ACK/NACK information is included.

9. The method of claim 6, wherein all allocated TBFs are aborted if FANR activations are inconsistent.

10. The method of claim 6, wherein the step of receiving at least one message for establishing or reconfiguring the plurality of TBFs comprises:

receiving a first message for establishing or reconfiguring at least one TBF from the network; and receiving a second message for establishing or reconfiguring at least one TBF from the network.

* * * * *